United States Patent [19]
Johnson

[11] 3,862,652
[45] Jan. 28, 1975

[54] TREE SHEAR HEAD

[75] Inventor: Earl Clinton Johnson, Bellevue, Iowa

[73] Assignee: Deere & Company, Moline, Ill.

[22] Filed: Feb. 7, 1974

[21] Appl. No.: 440,304

[52] U.S. Cl. .............................. 144/34 E, 144/3 D
[51] Int. Cl. ............................................. A01g 23/08
[58] Field of Search .......... 144/2 Z, 3 R, 3 D, 34 R, 144/34 E, 309 AC

[56] References Cited
UNITED STATES PATENTS

| | | | |
|---|---|---|---|
| 3,540,501 | 11/1970 | Jonsson | 144/34 E |
| 3,640,322 | 2/1972 | Allen | 144/34 E |
| 3,808,909 | 5/1974 | Johnson | 144/34 E |
| 3,817,303 | 6/1974 | Kantola et al. | 144/34 R |
| 3,826,295 | 7/1974 | Johnson et al. | 144/34 E |

Primary Examiner—J. M. Meister
Assistant Examiner—W. D. Bray

[57] ABSTRACT

A tree shear head includes a main frame having a horizontally disposed extensible and retractable hydraulic motor housed in an upper portion thereof. The hydraulic motor includes oppositely extending piston rods which are secured to respective crank arms that are respectively formed rigidly with a pair of crankshafts that are rotatably mounted in the opposite sides of the main frame for rotation about respective fore-and-aft extending horizontal axes. Tree-engaging surface means are formed at the front side of the main frame centrally between the crankshaft axes. The pair of crankshafts are respectively linked to a pair of blade support arms which are pivotally mounted on the main frame for movement about a common axis located equidistant from and extending parallel to the crankshaft axes. A pair of cylindrically curved, plate-like cutting blades are respectively fixed to the pair of blade support arms, the blades being curved so as to lie on respective radii extending from the axis about which the blade support arms are swingable. The blades are located forwardly of the tree-engaging surface means at the forward side of the main frame and the lower end of the main frame comprises a projection, which tapers inwardly as viewed from the front of the shear head, and terminates at a location just below and behind the cutting blades when the latter are in a closed position wherein the respective cutting edges thereof are slightly overlapped. A pair of grapple tongs are mounted for horizontal swinging movement towards and away from each other in the vicinity of the axis about which the blade support arms are swingable and the tongs and axis are both located approximately midway between the top and bottom of the main frame when the latter is in an upright position. Fixed to the main frame and arranged in a circle about the front end of the pin mounting the blade support arms are a plurality of forwardly projecting spikes.

9 Claims, 9 Drawing Figures

TREE SHEAR HEAD

BACKGROUND OF THE INVENTION

The present invention relates to a tree shear head and more particularly relates to a tree shear head of the type which is pivotally secured to the end of a boom structure and which includes grapple tongs for aiding and positioning the head for shearing a tree and for controlling the tree once the latter has been sheared.

The present invention represents an improvement over the tree shear head which is disclosed in application Ser. No. 354,480, filed on Apr. 26, 1973 now U.S. Pat. No. 3,826,295 and assigned to Deere & Company, as is the present application. The tree shear head disclosed in the aforementioned patent application includes a main frame having tree-engaging surface means disposed centrally on the front side thereof for engaging a tree during the shearing thereof. For the purpose of grasping a tree and holding the tree-engaging surface means thereagainst, there is provided a pair of arcuately curved opposed grapple tongs which are mounted on the uppermost portion of the main frame for swinging movement towards and away from each other. Housed in the main frame just below and behind the grapple tongs is a horizontally disposed extensible and retractable hydraulic motor which has oppositely extending piston rods having their ends respectively connected to a pair of crank arms to provide the sole support for the motor, the crank arms respectively being fixed rigidly with a pair of horizontal fore-and-aft extending crank shafts which are rotatably mounted in the opposite sides of the main frame. A pair of blade support arms are mounted on the main frame for movement about a common fore-and-aft extending horizontal axis which is located equidistant from the pair of crankshafts and in the lowermost portion of the main frame. Respectively mounted on the pair of blade support arms are a pair of cylindrically curved, plate-like cutting blades which are each located so as to be on respective radii with the pivot axis of the blade support arms as their center. The pair of blade support arms are respectively linked to the pair of crankshafts and are moved in response to extension and retraction of the hydraulic motor to respectively swing the blade support arms and the cutting blades towards and away from each other. The links connecting the hydraulic motor to the arms is arranged such that the mechanical advantage between the motor and the respective arms increases as the arms move inwardly.

Under certain operating conditions, as when one blade encounters a greater resistance to cutting than the other blade, it has been found that the blade encountering the lesser resistance will move into the tree while the other remains stationary and acts as an anvil until the moving blade reaches the end of its movement. When this happens, the shear head "sees" unbalanced forces which tend to shift the shear head sideways about the location of engagement of the grapple tongs with the tree. Thus, the unbalanced forces of the moving blade act through a lever arm having the length of the distance between the moving blade and the grapple tongs and are resisted by the pivot pin supporting the blade arms and unduly high forces will appear at this point. Further, if the shear head is in fact shifted sideways by the unbalanced forces, the stationary shear blade will be dragged into the tree resulting in high and often damaging loads being experienced thereby due to the fact that the blade is not cutting along a path corresponding to its curvature, as designed. Also, once the shear head has shifted, the center of rotation of the moving blade will likewise be shifted from the position it was at the beginning of the blade travel into the tree, thus resulting in high bending loads being imposed on the moving blade.

Another disadvantage of the above-described shear head is that the grapple tongs may be closed upon a standing tree trunk prior to the shearing of the latter without the blades being properly disposed for cutting the tree. For example, the shear blade may be tilted either forwardly or rearwardly about the gripping location of the tongs on the tree resulting in the blades respectively being disposed either too far forwardly or rearwardly on the tree in which cases blunt supporting structures respectively at the rear and front of the blades will come into contact with the tree during shearing and will result in high loads being imposed on the shear frame and will result in severe damage to the tree rendering a portion thereof unsuitable for lumber.

Yet another disadvantage of the above-described shear head structure is that with the grapple tongs supported on the frame a considerable distance above the location whereat the blade support arms are supported the shear head cannot properly be placed on a tree growing at a considerable angle from the vertical relative to the ground.

Another disadvantage of the above-described shear head is that due to the fact that the blade support arms are connected to the lowermost part of the frame, the frame can be positioned on a tree having an enlarged base or butt swell such that the blades will begin to close on the enlarged portion resulting in the "angle of attack" of the blades being improper for keeping the reaction forces on the blades at a desirable level.

SUMMARY OF THE INVENTION

In accordance with the present invention, there is provided a tree shear head structure including a pair of grapple tongs, a pair of shear blades, and a main frame which are novelly arranged relative to each other. Specifically, as considered when in its normal upright position, the blade support arms of the shear head structure are mounted on the main frame for movement about a common horizontal axis which is located approximately halfway between the top and bottom of the main frame. The pair of grapple tongs are respectively mounted at opposite sides of the common axis for movement about respective vertical axes and are located so as to be swingable towards and away from each other in the vicinity of the common axis about which the blade support arms are swingable. That portion of the main frame which extends below the common axis converges inwardly to a location which is slightly below and behind the cutting blades when the latter are in a closed position. Because of their central location, the grapple tongs act so as to properly position the shear head relative to a tree to be sheared. The central location of mounting of the grapple tongs has the further advantage that unbalanced cutting forces during shearing will not act to tilt the shear head since the forces will act through the shear frame in the vicinity of the common axis of mounting for the blade support arms such that the unbalanced forces will cancel each other.

It is therefore an object of the invention to provide a tree shear head structure which can be easily positioned in a proper position for shearing a standing tree, even if the tree is angled considerably from the vertical, and constructed so as to maintain the effects of unbalanced shear forces at a minimum during operation. Specifically, it is an object to provide a pair of grapple tongs which are located so as to swing towards and away from each other in the vicinity of the common axis for mounting the blade support arms and so as to be approximately halfway between tree-engaging surface means adjacent the top and bottom of the shear head main frame so as to prevent the shear head from tilting fore and aft about the gripping location of the grapple tongs.

In furtherance of the above object, it is an object to provide a plurality of forwardly projecting spikes arranged on the frame in a circle about the front end of the pivot pin mounting the blade support arms on the frame.

Yet another object is to provide a main frame which has a lower portion that is tapered inwardly towards a location spaced just behind and rearwardly of the cutting blades when the latter are closed so as to present a small lower surface area which will permit the shear head to be lowered into snow or below grade.

These and other objects will become apparent from the ensuing description and the appended drawings.

DESCRIPTION OF THE PREFERRED EMBODIMENT

Figure 1:
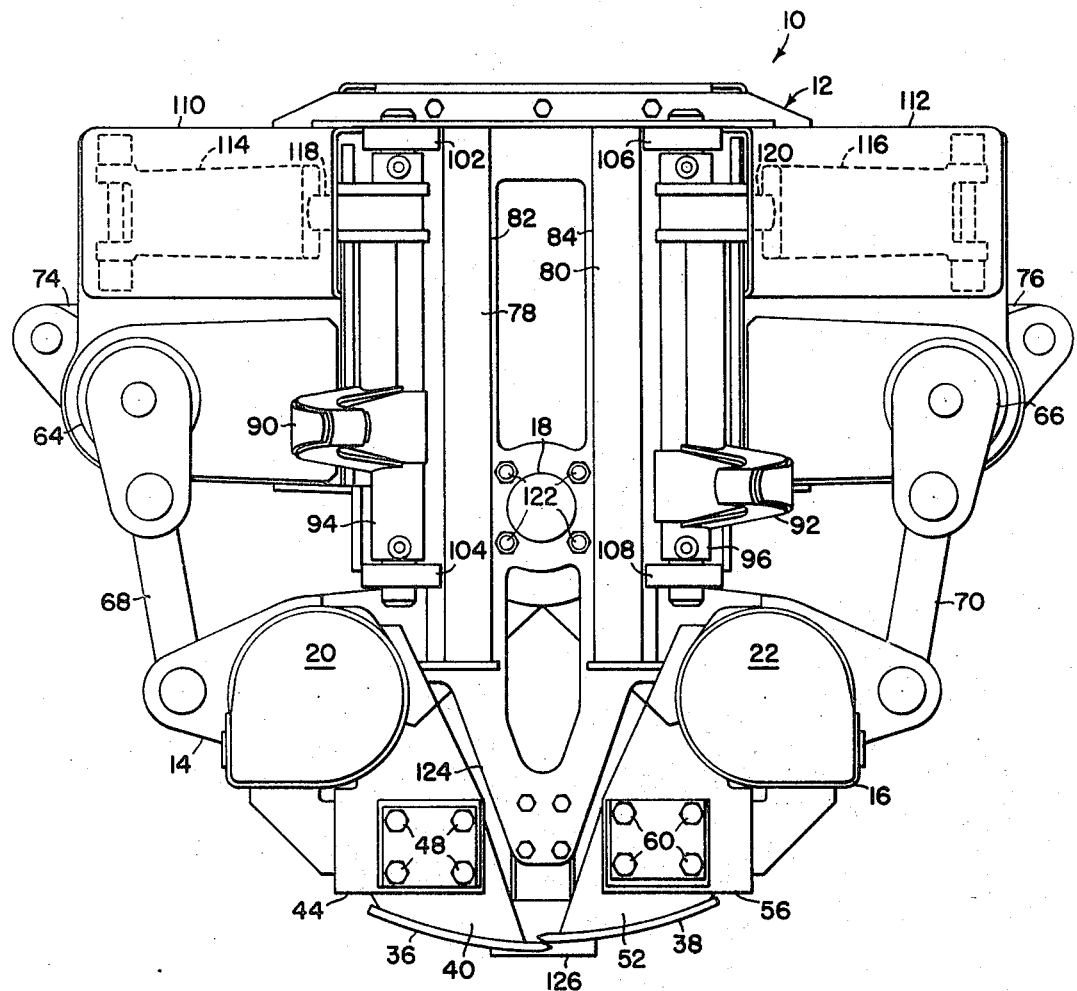
FIG. 1 is a front elevational view of the tree shear head shown in its normal upright position with the blades thereof being closed.
Figure 2:
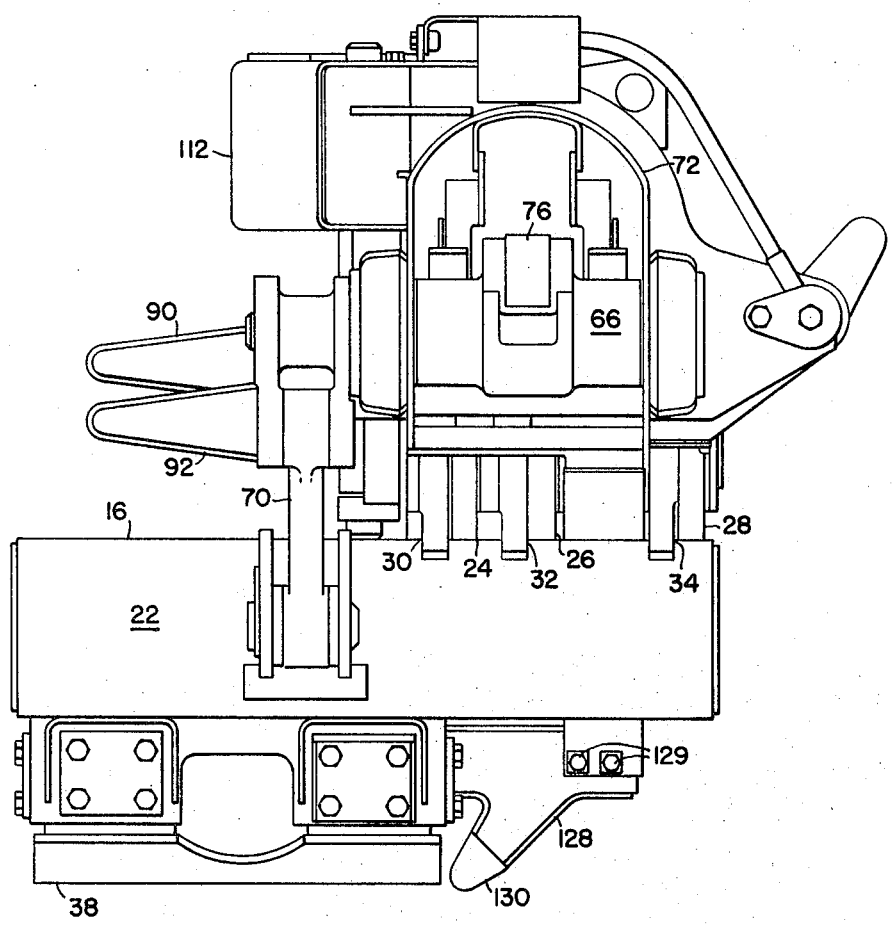
FIG. 2 is a left side elevational view of the tree shear head shown in FIG. 1.
Figure 3:
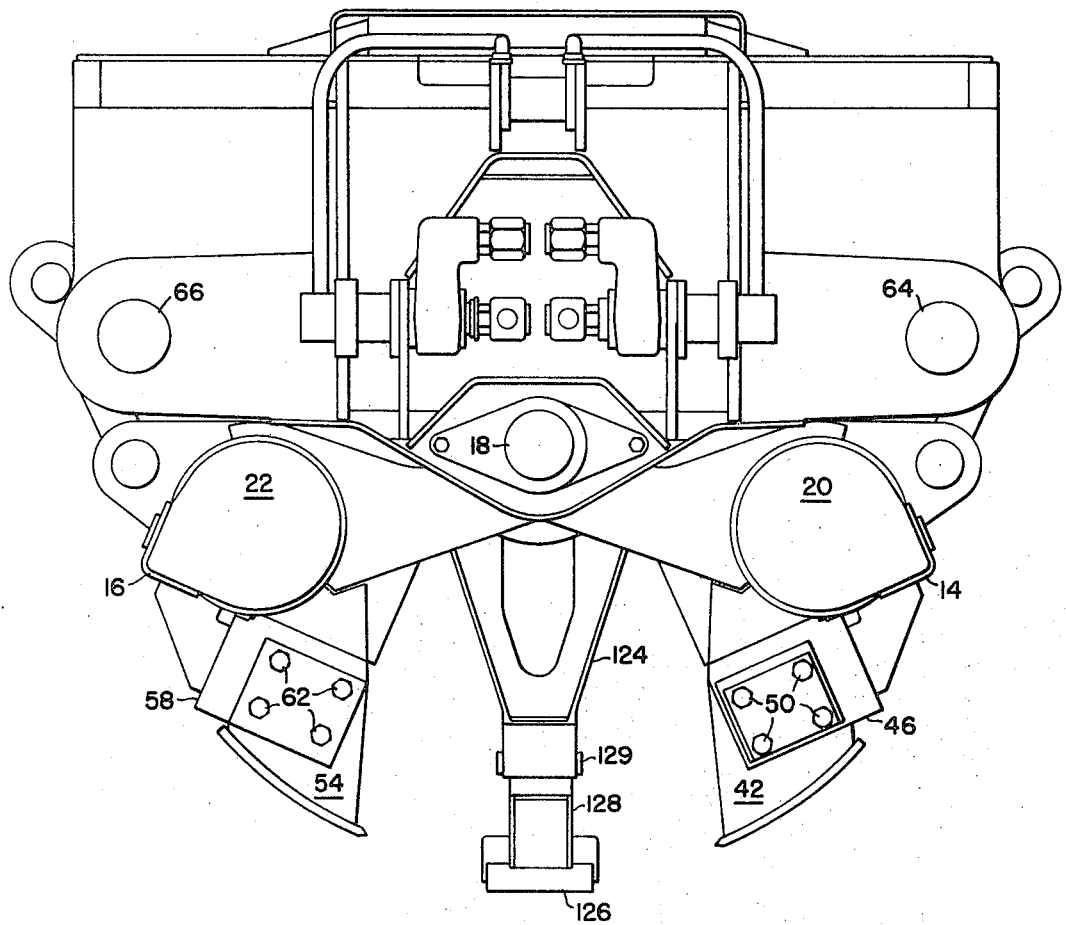
FIG. 3 is a rear elevational view of the tree shear head shown in FIG. 1 but with the blades thereof being open.

Referring now to FIGS. 1-4, therein is shown a tree shear head constructed according to the present invention and indicated in its entirety by the reference numeral 10. The shear head 10 includes a main frame 12 from which right and left blade support arms 14 and 16, respectively, are pivotally supported through means of a horizontal, fore-and-aft extending pivot pin 18 located centrally between the opposite sides of and midway between the top and bottom of the frame 12. The blade support arms 14 and 16, respectively, include substantially cylindrical tubular sections 20 and 22 located to the right- and left-hand sides of the frame 12 and extending alongside and forwardly of the frame. Projecting perpendicular to the right tubular section 20 and having their inner ends respectively welded at spaced locations along the rear portion of the tubular section are front, intermediate and rear flat arm sections 24, 26 and 28, respectively, the inner ends of the arm sections being journaled for rotation on the pivot pin 18. Similarly, extending perpendicular to and having their outer ends respectively welded to the left tubular section 22 at spaced locations along the rear portion of the tubular portion 22 are front, intermediate and rear flat arm sections 30, 32 and 34, respectively, the arm sections having their inner ends journaled on the pivot pin 18. Respectively secured to the lower forward portions of the right and left tubular arm sections 20 and 22 are right and left blades 36 and 38, respectively. The blades 36 and 38 are each constructed of relatively thin plates which are cylindrically curved so as to respectively lie on fixed radii from the axis of the pivot pin 18. For the purpose of securing the right blade 36 to the right tubular section 20, the upper surface of the blade is provided with front and rear connection structures 40 and 42, respectively, which are complementary to and received in front and rear right angle bracket structures 44 and 46 which are fixed to the tubular section 20. The right front connection structure 40 is secured to the right front connection bracket 44 through means of a plurality of bolts 48 while the right rear connection structure 42 is secured to the right rear connection bracket 46 through means of a plurality of bolts 50. Similarly, connection of the left blade 38 with the left tubular section 22 is made through means of front and rear connection structures 52 and 54, respectively, which are fixed to the upper surface of the left blade and respectively received in complementary shaped, front and rear connection brackets 56 and 58, respectively, fixed to the left tubular section 22. The front connection structure 52 is secured to the front connection bracket 56 through means of a plurality of bolts 60 while the left rear connection structure 54 is secured to the left rear connection bracket 58 through means of a plurality of bolts 62. Thus, it will be appreciated that the blades may be moved towards and away from each other by swinging the blade support arms 14 and 16 about the pivot pin 18.

For the purpose of selectively swinging the blade support arms 14 and 16 about the pivot pin 18, there is provided a powering mechanism comprising right and left crankshafts 64 and 66, respectively, rotatably mounted in the opposite sides of the frame 12 at respective locations located slightly above and equidistant from the pivot pin 18. Right and left links 68 and 70, respectively, are connected between the right crankshaft 64 and the right blade support arm 14 and between the left crankshaft 66 and the left blade support arm 16. Located between the crankshafts 64 and 66 in a transversely extending actuator housing 72 formed by the upward portion of the frame 12 is a hydraulic actuator including a cylinder (not shown) having oppositely extending left and right piston rods 74 and 76 extending therefrom and being respectively pivotally connected to the crankshafts 64 and 66. The hydraulic actuator includes structure (not shown) by which the piston rods 74 and 76 are selectively simultaneously extendible and retractable so as to effect simultaneous rotation of the crankshafts and simultaneous movement of the blade support arms 14 and 16 through means of the links 68 and 70.

The portion of the tree shear head 10 thus far described is substantially similar to the corresponding structure of the tree shear head disclosed in the aforementioned U.S. application Ser. No. 354,480, filed Apr. 26, 1973 now U.S. Pat. No. 3,826,295. Thus, the essence of the present invention lies in the structure to be described below.

Figure 4:
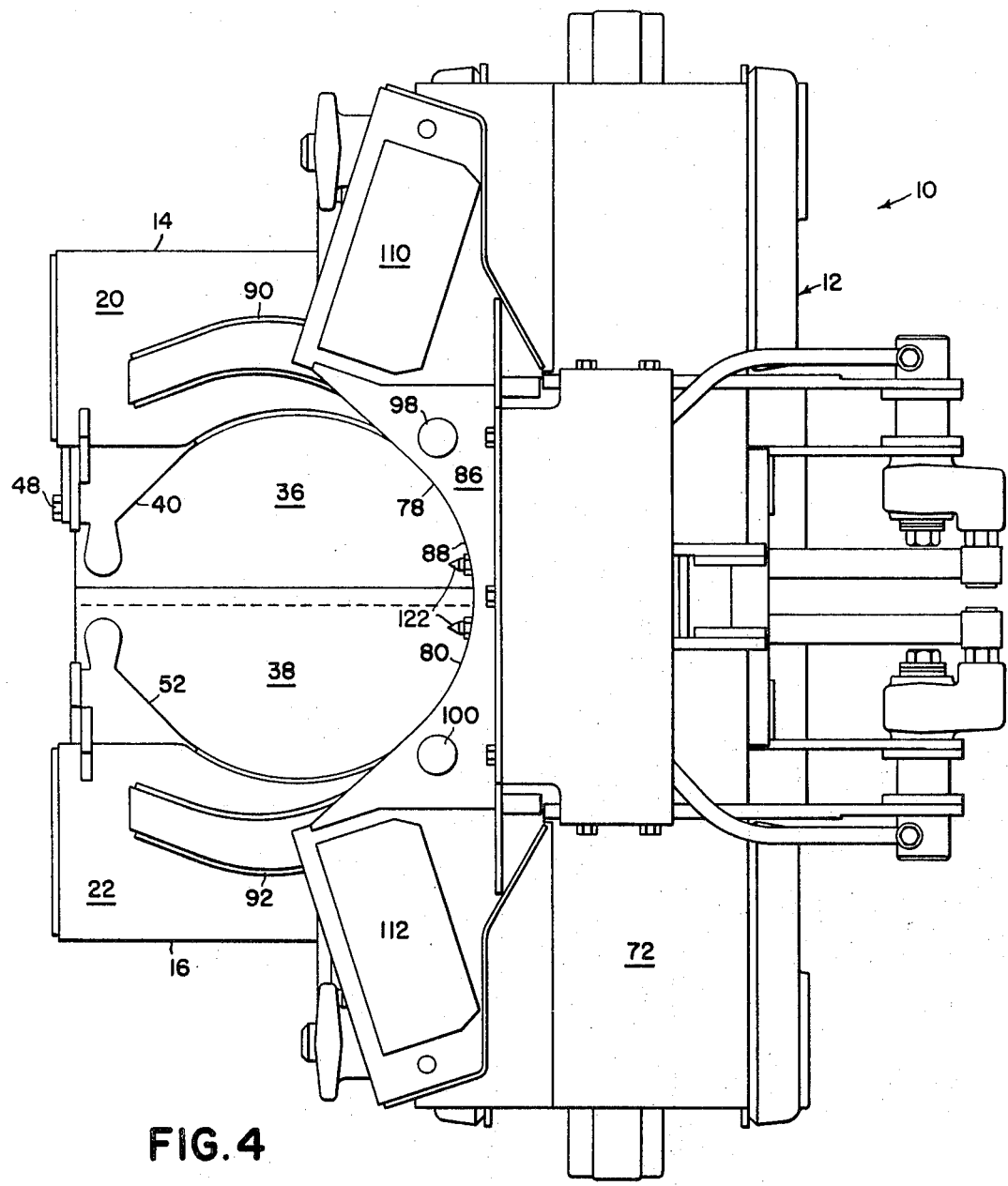
FIG. 4 is a top plan view of the shear head shown in FIG. 1.

The frame 12 includes structure on its forward side which defines tree-engaging surface means adapted for engaging the trunk of a tree when the tree shear head is properly positioned on the tree for shearing the same. Specifically, as can best be seen in FIGS. 1 and 4, the tree-engaging surface means is defined at least in part by inner surfaces 78 and 80, respectively of right and left vertically extending angle members 82 and 84, respectively forming an integral part of the frame 12 and located at opposite sides of and being adjacent to the forward end of the pivot pin 18. Fixed to the actuator housing 72 and having a horizontally extending portion fixed to the tops of the angle members 82 and 84 is a plate 86 having a substantially semi-circular recess 88 in the forward edge thereof, the recess being dimensioned such that the surfaces 78 and 80 appear to be tangent thereto when the shear head 10 is considered in top plan view, as shown in FIG. 4.

For the purpose of grasping the tree trunk of a standing tree and bringing the tree-engaging surface means of the frame 12 against the trunk of the tree, there is provided right and left grapple arms or tongs 90 and 92, respectively. The tongs 90 and 92 are respectively formed integrally with vertically disposed tubular members 94 and 96 which are respectively fixed to shafts 98 and 100 which are received therein and which in turn are respectively rotatably mounted in left and right pairs of upper and lower ears 102 and 104, and 106 and 108 respectively fixed to the frame 12 outwardly of and adjacent to the right and left angle members 82 and 84, respectively. The upper right and left front portions of the frame 12 are respectively constructed so as to define right and left actuator housings 110 and 112, respectively. Right and left hydraulic actuators 114 and 116 are respectively received in and pivotally mounted to the housings 110 and 112 and have respective piston rods 118 and 120 projecting inwardly and pivotally connected to respective lugs integral with the tubular members 94 and 96 and are thus operative upon simultaneous extension and retraction to respectively swing the tongs 90 and 92 towards and away from each other.

Fixed to the forward side of the frame 12 so as to be in a circular arrangement coaxial with the pivot pin 18 are a plurality of forwardly projecting spikes 122. The spikes 122 aid in reducing unbalanced cutting forces in the shear head by maintaining the shear head in place once the grapple tongs 90 and 92 are closed, it being noted that such closing will act to impale and keep a tree trunk impaled on the spikes.

As viewed from the front as it appears in FIG. 1, the frame 12 includes a lower frame structure 124 extending downwardly from the vicinity of the pivot pin 18 and having opposite sides which converge inwardly to a bottom end 126 of the frame. The lower frame structure 124 includes a detachable portion 128 which is detachably secured to the remainder of the structure 124 through means of a plurality of bolts 129. As viewed from the side, as appears in FIG. 2, the detachable portion 128 has a bottom end which projects forwardly to a tip 130 that forms the bottom end of the frame 12 and is located just rearwardly and below the level of the cutting blades 36 and 38 when the latter are closed.

Figure 5:
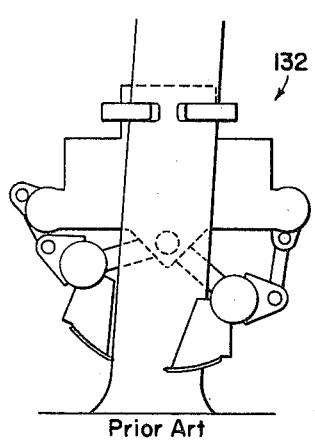
FIG. 5 is a schematic representation of a prior art tree shear head showing a condition wherein cutting is progressing with non-symmetric blade motion.
Figure 6:
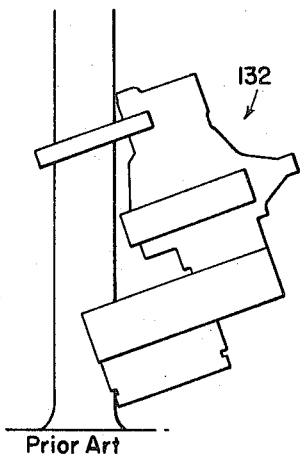
FIG. 6 is a schematic view of the tree shear head shown in FIG. 5, the tree shear head being shown as it would appear when the bottom thereof is too far rearwardly of the tree for proper shearing of the same.
Figure 7:
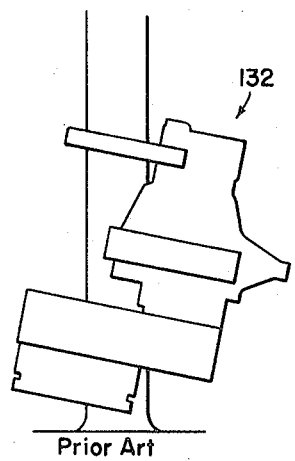
FIG. 7 is a schematic view similar to that of FIG. 6 showing the tree shear head positioned with the bottom thereof too far forwardly on the tree for proper shearing of the tree.
Figure 8:
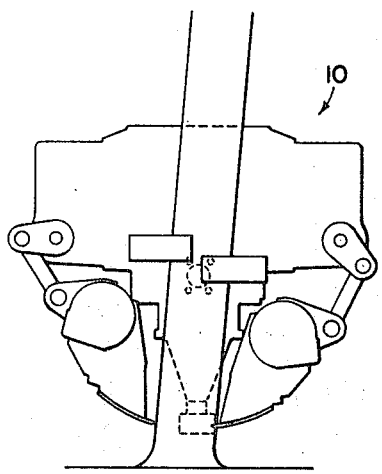
FIG. 8 is a schematic representation of the tree shear head of the present invention showing the tree shear head in an operation corresponding to that of the prior art tree shear head shown in FIG. 5.
Figure 9:
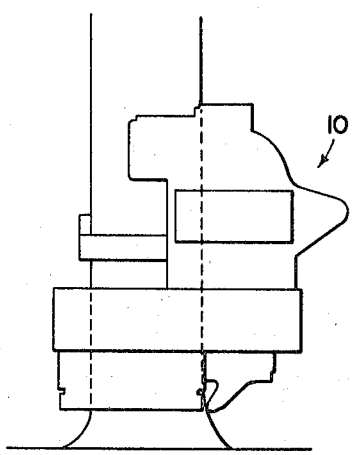
FIG. 9 is a schematic left hand elevational view of the tree shear head of the present invention showing the latter in a proper position for shearing a tree grasped by the grapple tongs thereof and showing how the projection at the bottom of the tree shear head serves to prevent the shear head from being lowered to the extent that the shear blades thereof will engage a butt swell at an objectionable angle of attack.

For the purpose of aiding in the description of the operation of the tree shear head 10 of the present application, a prior art tree shear head 132 is schematically depicted in certain modes of operation in FIGS. 5-7 for comparison with certain modes of operation of the present tree shear head 10, as shown schematically in FIGS. 8 and 9. Thus, as illustrated in FIG. 5, the prior art tree shear head 132 is shown in a condition or operating mode that sometimes occurs when one of the cutting blades is moved into the tree while the other acts as an anvil. During this mode of operation, unbalanced forces occur within the tree shear head 132. As the grapple tongs for positioning the shear head frame on a tree are located at a level considerably above the point of connection of the shear blade support arms with the frame, the reactive forces on the shear blades will tend to cause the tree shear head to be shifted sideways about the location on the tree trunk gripped by the grapple tongs. The unbalanced forces acting through the lever arm provided by the distance from the moving knife to the grapple tongs is resisted by the knife pivot and high forces will appear at this point. In contrast, as illustrated in FIG. 8, the grapple tongs of the present tree shear 10 grip the tree in an area which is substantially at the same level as the pivot axis for the knife support arms and unbalanced forces reacting through the blade support arms and the grapple tongs will be substantially canceled and transferred to the boom structure (not shown) for supporting the tree shear head 10.

A further advantage of having the grapple tongs positioned so as to act substantially at the level of the axis is that the spikes 122 will be maintained firmly embedded in the tree by the tongs gripping the tree in an area directly opposite from the spikes 122.

The importance of the grapple tongs being at a location approximately halfway between the top and bottom of the frame 12 is emphasized by the contrast in the positions of the prior art shear head 132 shown in FIGS. 6 and 7 with that of the shear head of the present invention shown in FIG. 9. Specifically, the prior art shear head 132 as shown in FIG. 6 is illustrated in a condition wherein the grapple tongs are grasped upon a tree and the tree shear head is tilted rearwardly about the area gripped by the grapple tongs. The amount of tilting is limited by the fact that the top of the shear head frame is in contact with the tree. When in this rearwardly tilted condition, the forward blade connection structures will come in contact with the tree when the actuator for actuating the blade support arms is operated to cause the blades to move towards each other. These knife support structures are blunt and their contact with the tree results in severe damage to the tree and high loads in the shear head frame. FIG. 7 shows the prior art shear head 132 in a condition wherein the grapple tongs are grasped upon a tree and the shear head is tilted forwardly about the area gripped by the grapple tongs. The amount of tilt here is limited by the contact of the lowermost portion of the frame with the tree trunk, it being noted that the lowermost portion of the frame is only slightly lower than the point of connection for the blade support arms. When in its forwardly tilted condition, the rearward blade support structures are exposed for contact with the tree and again their contact with the tree will cause severe damage to the tree and high loads in the shear frame. In contrast, the tree shear head of the present invention will never assume the tilted conditions of the prior art tree shear head as shown in FIGS. 6 and 7 since the grapple tongs located approximately midway between the top and bottom of the tree shear head frame gripping the tree trunk by the grapple tongs will automatically move the tree shear head frame against the tree trunk as shown in FIG. 9. Not only does the lower portion of the frame prevent the bottom thereof from assuming a forward position relative to that shown in FIG. 9, but the top 130 serves to contact any increased diameter or swell of the tree which might occur at the butt thereof so as to limit downward positioning of the tree shear head so as to prevent the shear blade knives from coming into contact with any objectionable butt swell. It is to be noted that the lower frame structure 124 presents a small area to the ground and thus affords minimum resistance to lowering the shear head in snow or below grade if only soil is present.

Thus, it will be appreciated that the tree shear head 10 is designed such that the operator can place it properly upon a tree for shearing the same in conditions where his visibility of the tree shear head relative to the tree is limited since he needs only to place the tree shear head properly for grasping the trunk with the grapple tongs, the operation of the tongs then automatically positions the tree shear head for proper operation of the shear blades.

What is claimed is:

1. In a tree shear of the type including a main frame having a front side portion defining a surface adapted for engagement with a side of a standing tree trunk when the latter is being sheared, a pair of blade support arms pivotally connected to said main frame for swinging movement toward and away from each other about a common axis extending crosswise to said surface, the blade support arms including forwardly extending portions extending beyond the front side of the main frame for being positioned on opposite sides of a tree trunk engaged by the surface, a pair of cylindrically-curved, plate-like blades being respectively secured to the pair of blade support arms for movement therewith to shear a tree trunk positioned therebetween, blade operating linkage means connected between the main frame and the blade support arms and including an extensible and retractable hydraulic motor selectively operably for swinging the arms and thus the blades towards and away from each other, the improvement comprising: tree grappling means including a pair of opposed, curved grapple arms mounted on said main frame for movement about respective pivot axes extending parallel to each other and disposed vertically with respect to and being spaced equidistance from said common axis, said grapple arms further being located so as to be substantially at the same vertical height as said common axis is when the main frame is in an upright position wherein said surface is substantially vertically disposed.

2. The tree shear defined in claim 1 wherein said common axis and pair of grapple arms are located approximately halfway between the top and bottom of the main frame when the latter is in its upright position.

3. The tree shear defined in claim 1 wherein a spike means is secured to the front of the main frame and projects forwardly in the vicinity of said common axis.

4. The tree shear defined in claim 1 wherein the main frame includes a projection which extends slightly below the cutting blades when the latter are in a closed position and the main frame is in its upright position, said projection being located vertically below said pivot axis and extending forwardly no further than the rearmost portions of said cutting blades whereby the projection will contact any swell at the bottom of a tree when the shear is being lowered so as to prevent the blades from coming into contact with any excessive swell.

5. The tree shear as defined in claim 4 wherein said projection generally converges towards a point in the downward direction to thereby present a small area to the ground which will have minimum resistance to lowering the shear in snow or below grade if only soil is present.

6. In a tree shear of the type including a support frame defining an elongate horizontally-extending, open-ended, tubular housing, a pair of crankshafts respectively rotatably mounted to said frame at opposite ends of said housing for rotation about a pair of parallel axes which are substantially horizontal when the support frame is in a normal upright position, the axes extending crosswise to the length of said housing, a first extensible and retractable motor means being located in said housing and being connected to said pair of crankshafts for effecting simultaneous rotation thereof, a tree engaging surface being located on the forward side of said support frame between said parallel axes for engaging a tree stem extending crosswise to said parallel axes, the pair of crankshafts each extending from said frame beyond said tree engaging surface means, a pair of blade structures rotatably mounted to said support frame for rotation about a third axis located equidistant from and extending parallel to said pair of parallel axes, the pair of blade structures extending forwardly from said frame beyond the tree engaging surface means and respectively including cutting edges elongated in a direction substantially parallel to said third axis and arranged so as to be movable with the respective blade structures about said third axis between an open position wherein they are adapted to be positioned at opposite sides of a tree stem and a close, moved-together position wherein they are disposed adjacent each other, a pair of link means respectively connecting said pair of crankshafts to said blade structures for effecting the movement of said cutting edges between the open and closed position upon selective actuation of said extensible and retractable motor means, the improvement comprising: a pair of grapple tongs being rotatably mounted on said support frame for rotation about respective vertical axes located on the opposite sides of and spaced equidistant from said third axis, said grapple tongs being positioned at an elevation which is approximately the same as that of said third axis; extensible and retractable motor means being connected to said grapple tongs for effecting movement of the latter towards and away from each other.

7. The tree shear defined in claim 6 wherein said third axis and said pair of grapple tongs are located approximately halfway between the top and bottom of said support frame when the latter is in its upright position.

8. The tree shear defined in claim 6 wherein a spike means is secured to the front of the main frame and projects forwardly in the vicinity of said third axis.

9. The tree shear defined in claim 6 wherein said support frame includes a projection extending downwardly in centered relationship to and below said third pivot axis and forming the sole part of said support frame which is lower than said third pivot axis, said downwardly projecting portion, as viewed from the front of the support frame, having an upward portion which is no wider than the distance between said pair of vertical axes and tapering downwardly to a bottom end which is spaced slightly below and behind the plate-like blades when the latter are in said closed position.

* * * * *